Figure 1:
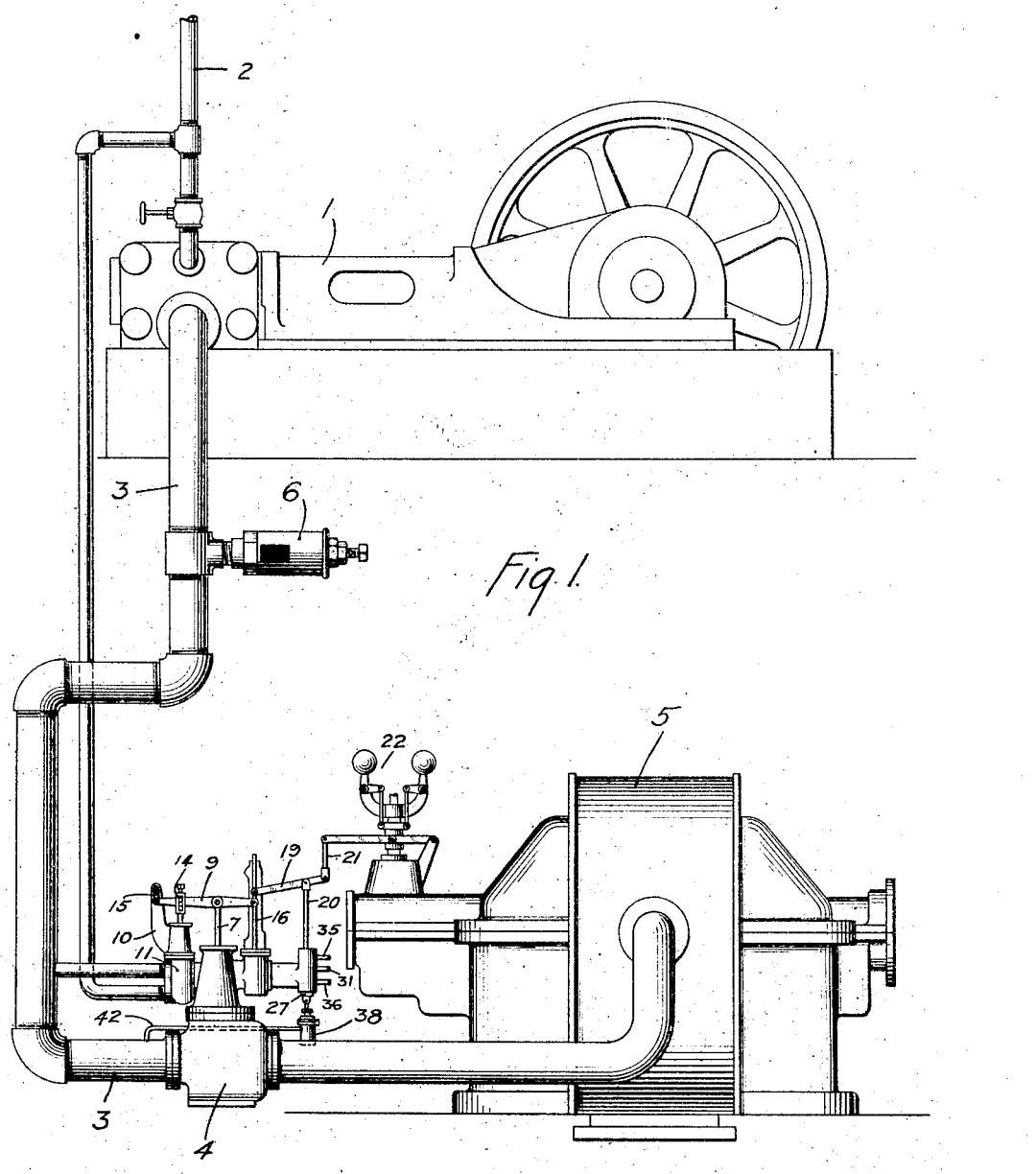

W. B. FLANDERS.
TURBINE CONTROLLING MECHANISM.
APPLICATION FILED MAY 1, 1912.

1,082,689.

Patented Dec. 30, 1913.

WITNESSES:

INVENTOR.
Warren B. Flanders
BY
HIS ATTORNEY IN FACT.

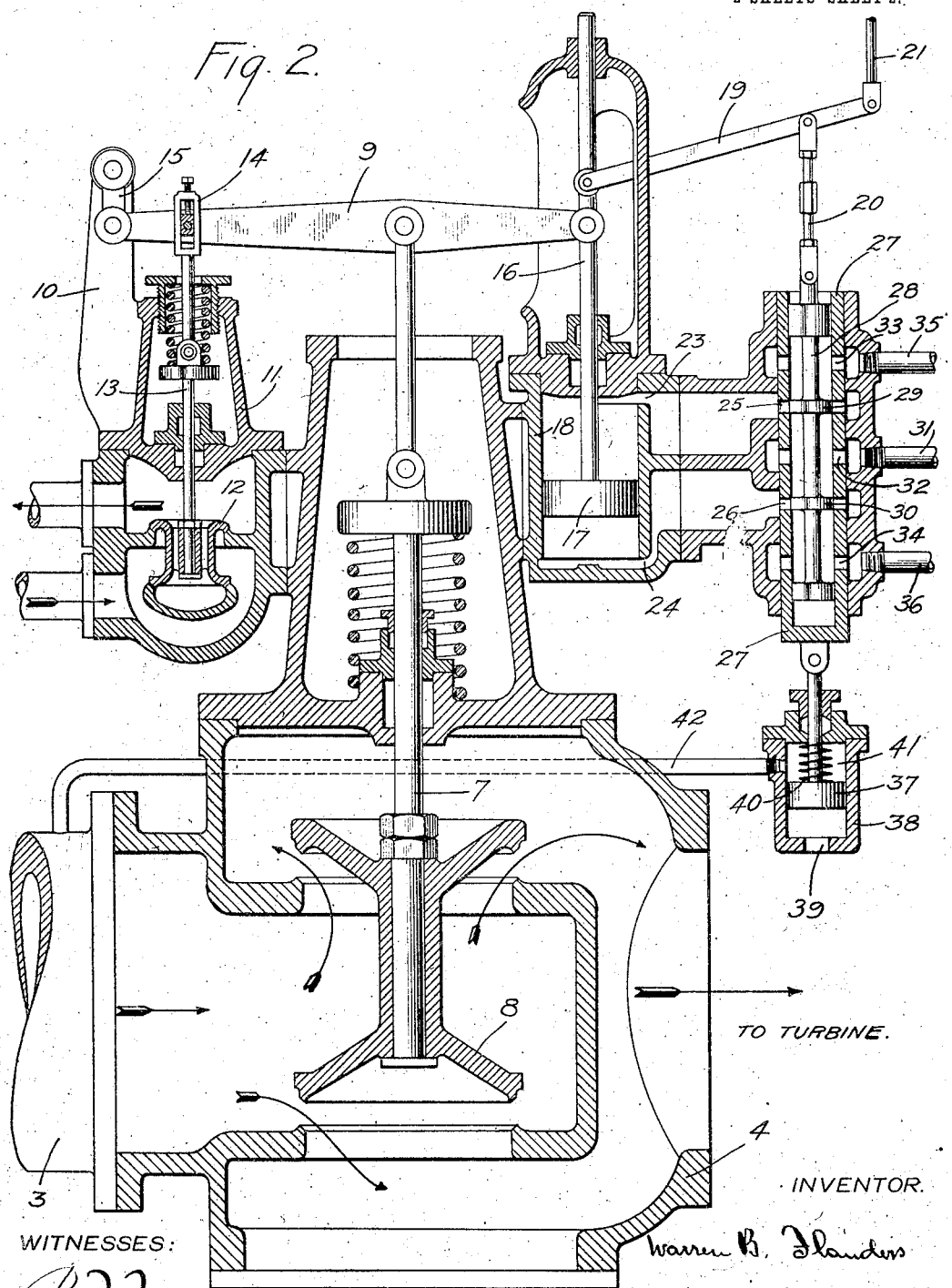

UNITED STATES PATENT OFFICE.

WARREN B. FLANDERS, OF PITTSBURGH, PENNSYLVANIA, ASSIGNOR TO THE WESTINGHOUSE MACHINE COMPANY, A CORPORATION OF PENNSYLVANIA.

TURBINE-CONTROLLING MECHANISM.

1,082,689.

Specification of Letters Patent. Patented Dec. 30, 1913.

Application filed May 1, 1912. Serial No. 694,512.

*To all whom it may concern:*

Be it known that I, WARREN B. FLANDERS, a citizen of the United States, and a resident of Pittsburgh, in the county of Allegheny and State of Pennsylvania, have made a new and useful Invention in Turbine-Controlling Mechanism, of which the following is a specification.

This invention relates to a turbine-controlling mechanism.

One of the objects is to maintain a constant speed at a given load irrespective of the steam pressure in the system.

According to my invention, should the turbine be running on exhaust steam from a high pressure engine and have connections with a source of high pressure steam, as for example a boiler, a constant speed would be maintained at a given load whether there was more than enough or just enough exhaust steam available to carry the load; for example, at half load if the pressure in the line were ten pounds and more exhaust steam were available than was needed to carry the load, the excess steam would be permitted to escape to atmosphere, or be carried off or shunted around the turbine. If the pressure in the main should drop, due to a decrease in the supply, the valve would open wider to accommodate the steam at the decreased pressure without necessitating a change in speed.

In the drawings: Figure 1 is a diagrammatic view of a system constructed in accordance with my invention; and Fig. 2 is a sectional view of a valve mechanism constructed in accordance with my invention.

Referring now to the drawings by numerals of reference, 1 designates a high pressure engine, as for example, a reciprocating steam engine receiving steam from a source of high pressure, for example a boiler through the pipe 2. The engine 1 is illustrated as exhausting through a pipe 3 to the valve casing 4 of a low pressure turbine 5, and within the pipe 3 is a safety or blow-off valve 6, this valve 6 being between the valve casing 4 and the engine 1. The valve 4 is here illustrated as being in the line 3 between the turbine 5 and the engine 1, the valve-stem 7 of the valve 8 being connected to a lever 9 having a link connection with a bracket on the valve casing 11 of a high pressure valve 12. The stem 13 of the valve 12 is connected to the lever 9 by a lost motion connection 14. The end of the lever 9 distant from the link connection 15 secured to bracket 10 is connected to the stem 16 of the piston 17 in the fluid relay cylinder 18. The stem 16 is also connected to a floating lever 19 connected to the valve-stem 20 intermediate its ends and at one end to a rod 21 forming part of the governor 22. The cylinder 18 is provided with two ports 23 and 24 on opposite sides of the piston 17. These ports may either be exhaust or admission ports, the ports communicating with ports 25 and 26 of a sliding bushing 27 surrounding the valves connected to the stem 20, and on spindle 28 forming part of the stem 20 are valve disks 29 and 30 which normally cover ports 25 and 26, the fluid for the cylinder 18 being admitted through a pipe 31 into the port or ports 32 so that when either the port 25 or 26 is uncovered, oil will be admitted either on top or below the piston 17 and exhaust from the opposite side through either the ports 33 or 34 and out through the pipes 35 or 36 into the oil system after the manner usually employed in fluid relay systems.

By reference to Fig. 2 it will be observed that one end of the bushing 27 is connected to a piston 37 in a cylinder 38 here shown having a port 39 open to the atmosphere. On top of the piston 37 is a spring 40 within the space 41 and into which leads a pipe 42 in communication with the supply line 3. The port 39 may communicate with atmosphere or with the system, as for example the exhaust, it being designed that under ordinary operating conditions the pressures on opposite sides of the piston 37 will hold said piston in equilibrium but preponderance of pressure on either side of the piston 37 will cause the bushing to slide either toward or away from the lever 19 and open one of the ports 25 or 26 to inlet pressure and the other port to exhaust.

Suppose the engine is operated at constant load and the governor has been set for a definite speed; in the event that the pressure in the pipe 3 increases due to a superfluous amount of steam from the exhaust engine, the pressure in the chamber 41 will increase or preponderate over the pressure at the exhaust 39 of the cylinder 38 and the bushing will be moved so as to uncover the port 25 admitting fluid to the top of the piston 17 so that the valve 8 will be partially closed admitting the same amount of steam to the turbine as before. Any excess steam may be blown off through the relief valve 6 or be by-passed around the turbine in some cases. Now suppose the pressure in the pipe 3 drops, there will be a corresponding drop of pressure in the chamber 41 and the pressure in the cylinder 38 below the piston 37 preponderating over that in the chamber 41 will cause the bushing to move in a direction away from the cylinder 38 so as to open the port 26 admitting fluid under pressure through the port 24 to the under side of the piston 17 so as to cause the valve 8 to open more or less and in some cases a sufficient distance so that the lever 9 will unseat the valve 12 and admit high pressure steam to augment that from the exhaust of the engine 1.

It will be apparent from the above that aside from the governor, I have provided means responsive to variations in pressure in the system for changing the opening of the inlet valve so as to maintain a constant speed for a constant load under differences of pressure in the supply main.

It is obvious that changes of form, proportion, and minor details of construction may be made without departing from the spirit of my invention, and I reserve the right to make such changes as may be found necessary from time to time without departing from the spirit of my invention.

Having thus described my invention, what I claim is:

1. In a fluid controlling device for turbines, the combination of a low pressure turbine having a steam pipe leading thereto, a low pressure valve in the steam pipe, a pipe communicating with the low pressure steam pipe and adapted to receive high pressure steam and admit it to the pipe in front of the low pressure steam valve, a valve in the high pressure steam pipe, a speed governor connected to said valves, an oil relay operated by the speed governor for causing the low pressure steam valve to open its fullest amount before the high pressure steam valve may open, and a ported device controlling the admission of oil to the relay and operated by differences of pressure in the low pressure steam pipe for causing the oil relay to operate irrespective of the action of the governor.

2. In a fluid controlling device for low pressure turbines, a pipe connected to said turbine and adapted to supply steam to the turbine at relatively low pressure and to receive steam from the exhaust of a prime mover, a pipe adapted to receive steam direct from the boiler, said pipe being connected to the first named pipe, a valve in the first named pipe, a valve in the second mentioned pipe, a lever connected to both valves and having a lost motion connection with the second mentioned valve so that the first mentioned valve must open its fullest amount before the second mentioned valve may open, a governor-controlled oil relay for operating the lever, and a ported device responsive to variations in pressure in the first mentioned pipe for actuating the oil relay irrespective of the action of the governor.

In testimony whereof, I have hereunto subscribed my name this 30th day of April, 1912.

WARREN B. FLANDERS.

Witnesses:
C. W. McGHEE,
ADA ROMIG.